United States Patent [19]

Tarlton, Sr.

[11] Patent Number: 4,947,969

[45] Date of Patent: Aug. 14, 1990

[54] CENTER LOAD CLUTCH BRAKE

[75] Inventor: James K. Tarlton, Sr., Auburn, Ind.

[73] Assignee: Dana Corporation, Toledo, Ohio

[21] Appl. No.: 418,565

[22] Filed: Oct. 10, 1989

[51] Int. Cl.$^5$ .............................................. F16D 67/02
[52] U.S. Cl. ............................ 192/13 R; 188/218 XL
[58] Field of Search ............... 192/13 R, 18 R, 107 R, 192/107 C; 188/218 XL

[56] References Cited

U.S. PATENT DOCUMENTS

| | | | |
|---|---|---|---|
| 3,763,977 | 10/1973 | Sink | 192/13 R X |
| 4,043,437 | 8/1977 | Taylor | 192/13 R |
| 4,046,237 | 9/1977 | Root et al. | 192/13 R |
| 4,186,826 | 2/1980 | MacKendrick et al. | 192/13 R |
| 4,657,124 | 4/1987 | Flotow | 192/13 R |
| 4,762,215 | 8/1988 | Flotow et al. | 192/107 C |
| 4,782,926 | 11/1988 | Kitano et al. | 192/13 R |
| 4,807,730 | 2/1989 | Kitano et al. | 192/13 R |
| 4,832,165 | 5/1989 | Nishimura et al. | 192/13 R |

Primary Examiner—Richard Lorence
Attorney, Agent, or Firm—Marshall & Melhorn

[57] ABSTRACT

A center load clutch brake assembly has a pair of covers secured together to form a housing enclosing torque limiting components which include a ring shaped inner brake washer having a pair of radially inwardly extending lugs for engaging splines or grooves formed in a drive shaft coupled between a vehicle clutch and a vehicle transmission. The inner brake washer is rotatably coupled to a pair of concentric outer washers through a lost motion coupling. The outer washers each have reduced thickness outer peripheral portions which define an annular groove therebetween for retaining a ring shaped wave washer. The wave washer biases the two outer washers against the inner surfaces of the housing and has a pair of tabs for engaging openings in the housing. Facing material is provided on the outer surfaces of the housing for frictionally engaging a clutch release bearing and an outer surface of the transmission housing when a clutch linkage actuates the release bearing to disengage the clutch.

13 Claims, 2 Drawing Sheets

CENTER LOAD CLUTCH BRAKE

BACKGROUND OF THE INVENTION

The present invention relates generally to friction clutches used in vehicles and, in particular, to clutch brakes utilized in non-synchronized heavy-duty transmissions. Such brakes are activated upon disengagement of a main clutch to retard the rotation of transmission gearing for easier gear shifting.

It is well known in the art to retard vehicle transmission gears prior to gear shifting by using a clutch brake activated by a throw-out mechanism upon disengagement of the main clutch. Torque limiting clutch brakes which provide a limited amount of braking torque are also well known, and are widely preferred because of their durability and long life.

Resilient means have been used in torque limiting clutch brakes to cushion the braking effect and to prevent excessive braking pressure which may damage the clutch brake. For example, prior art devices have included opposed Belleville springs for establishing a predetermined frictional load between the inner and outer members of clutch brakes. However, clutches utilizing opposed Belleville springs must be carefully and accurately designed and assembled to evenly balance one spring against the other. An imbalance between the springs can cause one to overcome the other, flipping or reversing its concavity, thereby reducing the effectiveness and shortening the life of the clutch brake. Furthermore, such springs tend to concentrate a load over a small surface area thereby tending to spread the covers apart and cause excessive wear on the exterior friction surfaces.

Prior art clutch brakes were often designed with cover assemblies which act as heat sinks for heat originating both externally and internally of the cover assembly. In such devices, excessive wear in the cover facings may result in excessive heat built up in the cover assembly which may cause premature deterioration of the friction facings.

SUMMARY OF THE INVENTION

The present invention concerns an apparatus for use as a clutch brake during the operation of non-synchronized vehicle transmissions. A clutch brake assembly comprises a pair of generally cup-shaped covers which are secured together to form an internal cavity enclosing components of a torque limiting assembly.

The torque limiting assembly includes a ring shaped inner brake washer having a pair of inwardly extending lugs which are adapted to engage the drive shaft connected between a vehicle clutch and a vehicle transmission. The inner brake washer is coupled to a pair of concentrically disposed outer washers through a lost motion coupling. The outer washers are frictionally coupled to the adjacent covers by a wave washer disposed in a groove formed by reduced thickness outer peripheral portions of the outer washers. Thus, the clutch brake assembly is center loaded with the outer washers being biased outwardly in opposite directions.

The wave washer includes a pair of outwardly extending tabs which engage cooperating openings formed in the one of the covers adjacent a clutch release bearing mounted on the drive shaft. The outer surfaces of the covers have a friction facing material attached thereto for engaging the facing surfaces of the clutch release bearing and the transmission housing when a clutch linkage is actuated to disengage the clutch. Thus, the covers and the wave washer will tend to stop rotating with the drive shaft which, through the frictional engagement with the outer washers, will tend to stop the rotation of the outer washers, the inner brake washer and the drive shaft.

It is an object of the present invention to provide a clutch brake assembly having decreased spread between the covers.

It is a further object of the present invention to provide a clutch brake having increased wear surfaces and increased heat dissipation.

It is another object of the clutch brake assembly according to the present invention to increase the torque available for slowing the rotation of a drive shaft coupled to the clutch brake assembly.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
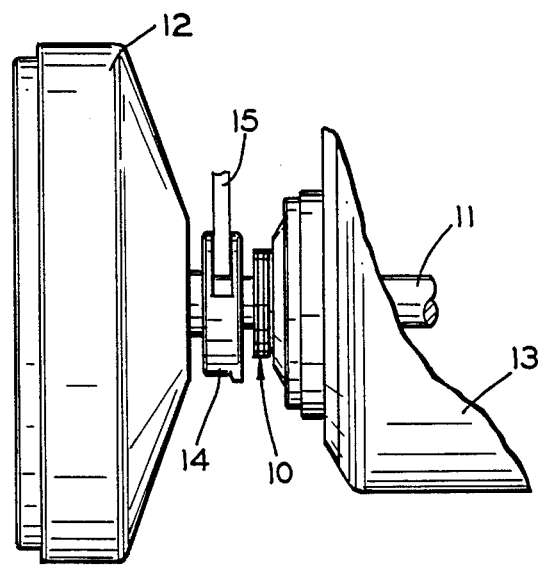
FIG. 1 is a schematic side elevation view of a clutch brake in accordance with the present invention illustrated in association with cooperating drive line components of a vehicle.

As shown in FIG. 1, a clutch brake assembly 10, according to the present invention, is mounted with associated drive line components of a vehicle (not shown). A drive shaft 11 extends between a conventional pull type friction clutch 12 and a non-synchronized vehicle transmission 13. The drive shaft 11 is rotatably supported by suitable bearings, typically anti friction bearings (not illustrated) in the housings of the clutch 12 and the transmission 13. The drive shaft 11 transfers power from the driven components of the clutch 12, when they are engaged, to gear ratio selecting components within the transmission 13 according to conventional practice.

The drive shaft 11 extends through the center of the clutch brake assembly 10 which is positioned adjacent the transmission 13. Positioned between the clutch brake assembly 10 and the clutch 12 and slidably disposed upon the drive shaft 11 is a clutch release bearing 14. The clutch release bearing 14 may be operated by a conventional clutch linkage 15 which disengages the clutch 12 by translating the release bearing 14 away from the housing of the clutch 12, toward the clutch brake assembly 10 according to conventional practice.

Figure 2:
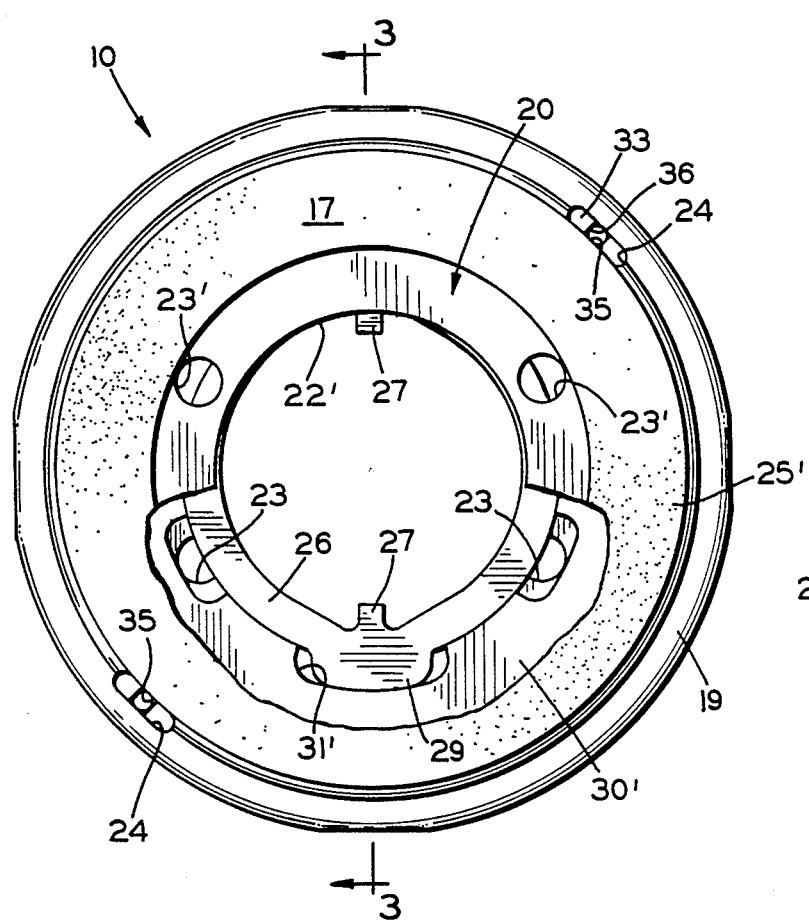
FIG. 2 is an enlarged end view of the clutch brake shown in FIG. 1 with portions broken away to more clearly illustrate details.
Figure 3:
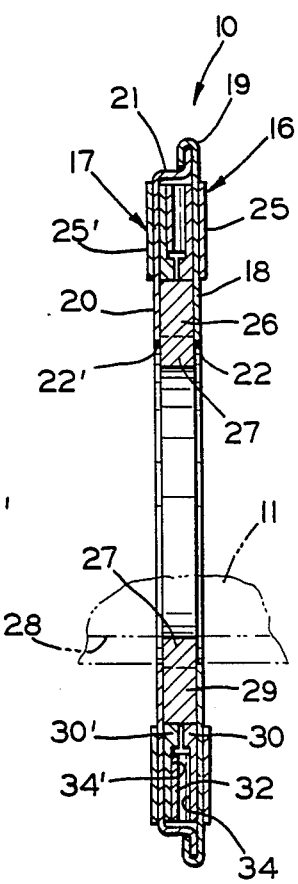
FIG. 3 a cross sectional view taken along the line 3—3 in FIG.
Figure 4:
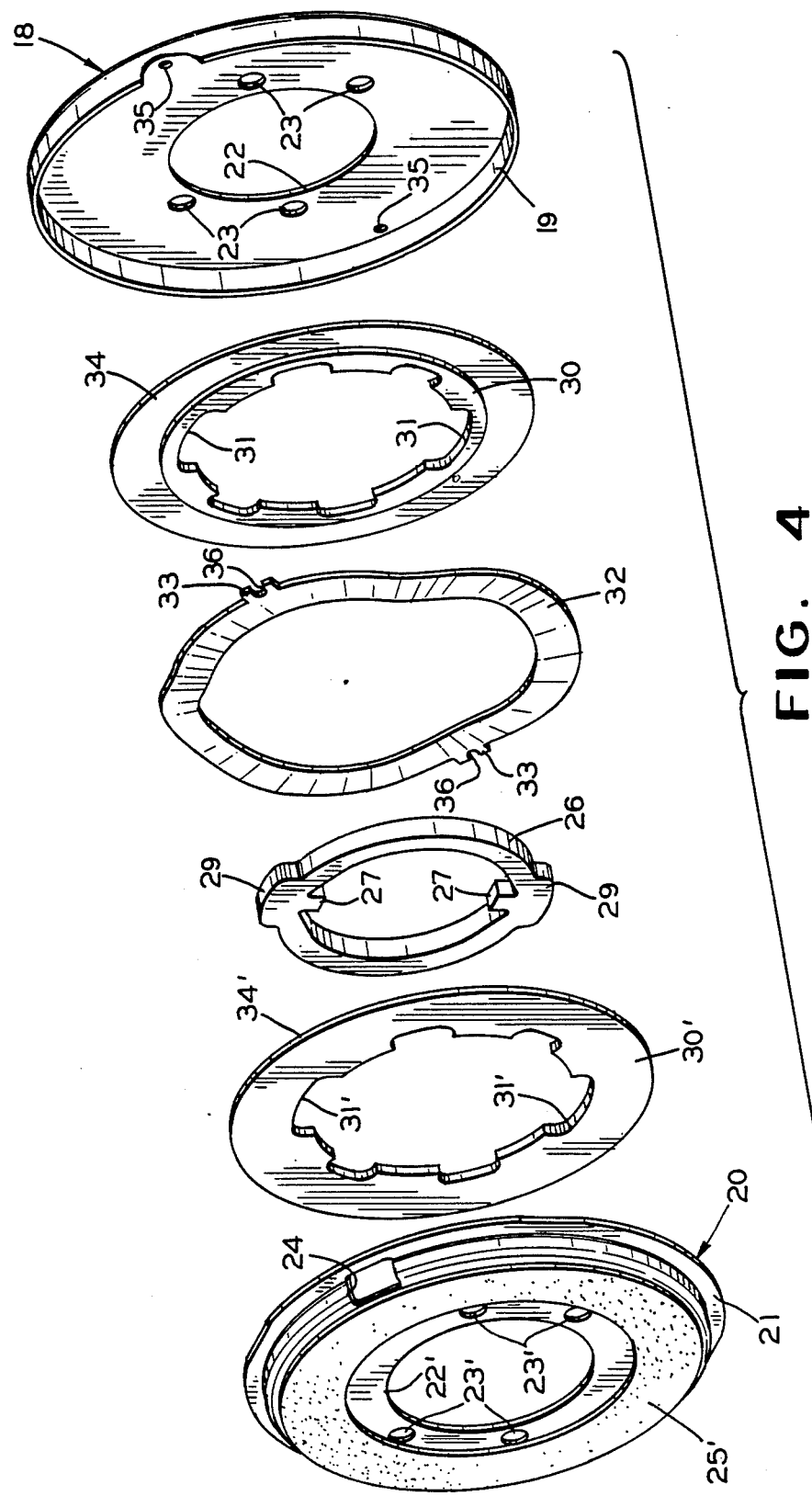
FIG. 4 is an exploded perspective view of the clutch brake of FIG. 1.

The clutch brake assembly 10, according to the present invention, is shown in more detail in FIGS. 2 through 4. The clutch brake assembly 10 includes a pair of facing and cover assemblies 16 and 17 which are attached together to form a housing. The assembly 16 includes a cup shaped cover 18 having a peripheral flange 19 extending axially in the direction of the second facing and cover assembly 17. The second assembly 17 also includes a cup shaped cover 20 with a peripheral flange axially extending toward the first facing and cover assembly 16. The flange 21 extends axially from the peripheral edge of the cover 20 and bends to extend radially outwardly. The outer diameter of the flange 21 is less than the inner diameter of the flange 19 such that the assembly 17 fits within the flange 19 of the assembly 16. When assembled together, the flange 19 is rolled over the radially extending peripheral portion of the flange 21, thereby tightly and positively securing the two opposed assemblies 16 and 17 together to form a housing with an internal cavity. The facing and cover assemblies 16 and 17 may, alternatively, be secured by welding, fasteners, or other suitable, similar means.

Each of the covers 18 and 20 defines a centrally disposed aperture 22 and 22' respectively through which the drive shaft 11 extends as shown in FIG. 3. Each of the covers 18 and 20 also has defined therein four smaller apertures 23 and 23' respectively positioned adjacent the central aperture 22 and 22' respectively. As shown in FIG. 2, the smaller apertures 23 and 23' are arranged in axial alignment when the facing and cover assemblies 16 and 17 are assembled together. The cover 20 also includes a pair of diametrically opposed generally rectangular openings 24. As shown in FIG. 4, the opening 24 is formed completely through the axially extending portion of the flange 21 and extends both into the radially extending portion of the flange 21 and the main body of the cover 20. The corners of the opening 24 are rounded.

Each of the facing and cover assemblies 16 and 17 also includes an outer friction surface such as a generally annular facing element 25 and 25' respectively typically formed of an organic friction material. The facings 25 and 25' may be bound to the outer surfaces of the covers 18 and 20 in any of several ways, such as adhesive, well known in the art. The facings 25 and 25' are positioned for frictional engagement with adjacent surfaces on the transmission 13 and the release bearing 14.

The facing and cover assemblies 16 and 17 define an internal cavity for the operative components of the clutch brake assembly 10. An inner brake washer 26 is formed as a ring and includes a pair of diametrically opposed radially inwardly extending lugs 27 which are received within and engaged by complimentarily disposed channels or grooves 28 formed in the drive shaft 11 as shown in FIG. 3. The lugs 27 thus rotatably couple the inner brake washer 26 to the drive shaft 11 while permitting relative axial motion therebetween. Formed in the periphery of the inner brake washer 26 are a second pair of diametrically opposed but radially outwardly extending lugs 29.

A second, outer washer 30 is formed as an annular or ring member. A pair of the outer washers 30 and 30' are disposed concentrically about the inner brake washer 26. Each outer washer 30 and 30' has an inner marginal edge defining a plurality of slots, at least a pair of diametrically opposed slots 31 and 31' being generally complimentary to and receiving the lugs 29 on the inner washer 26. The slots 31 and 31', however, are elongated, that is, longer than the circumferential length of the lugs 29 and thus, their alternate bi-directional engagement exhibits several annular degrees of lost motion. This lost motion or rotational free travel between the inner brake washer 26 and the outer washers 30 and 30' exists because the lugs 29 have a shorter circumferential length than the elongated slots 31 and 31'.

The outer washer 30 (and 30') can be fabricated of powdered metal having appropriate frictional and heat sink characteristics. A preferred material is an oil based powdered metal, such as PMTA FN 0205 R with two percent graphite powdered metal (6.4–6.8 density) Gulf plastic impregnation, which facilitates slippage with the frictional members after a predetermined torque is reached. Other oil based materials such as special oil based steels as well as glass filled synthetic resin, for example, may also be used.

Also included in the clutch assembly 10 is an axially resilient spring means. The spring means can be a suitable form of compression spring such as a wave washer 32. The wave washer 32 is preferably fabricated of steel which has been full hard tempered to a Rockwell C hardness of between forty-six and forty-eight. The wave washer 32 is formed with four circumferentially equally spaced waves. The wave washer 32 is positioned between the pair of outer washers 30 and 30' and provides a biasing force to maintain each of the outer washers in intimate, frictional engagement with the corresponding adjacent inner surfaces of the covers 18 and 20. The wave washer 32 includes a pair of diametrically opposed, radially outwardly projecting tabs 33. The tabs 33 register with the pair of diametrically opposed openings 24 formed in the cover 20 thereby rotationally securing these components together.

The wave washer 32 is retained in a groove formed by the adjacent peripheral portions of the outer washers 30 and 30'. The opposed facing surfaces of the outer washers 30 and 30' each have a reduced thickness edge portion 34 and 34' respectively. Typically, the thickness of the inner brake washer 26 defines the distance between the covers 18 and 20 when the clutch brake assembly 10 is completely assembled. The thicker, radially inward portion of each of the outer washers 30 and 30' is less than one half of the thickness of the inner brake washer 26. If the outer surfaces of the outer washers 30 and 30' are in contact with the inner surfaces of the covers 18 and 20, the width of the groove defined by walls formed by the reduced thickness edge portions 34 and 34' is less than the free height of the wave washer 32. Thus, the wave washer 32 is compressed to generate or provide a biasing force against the outer washers 30 and 30' to bias each of the outer washers 30 and 30' into engagement with the adjacent inner surface of the corresponding one of the covers 18 and 20. This biasing force also tends to prevent the covers 18 and 20 from interfering with the rotational action of the lost motion coupling between the inner brake washer 26 and the outer washers 30 and 30'.

As an aid to alignment during assembly of the clutch brake assembly 10, the cover 18 has a pair of diametrically opposed alignment apertures 35 formed therein adjacent the flange 19. Each of the tabs 33 has a half circular cutout 36 formed in the outer peripheral edge thereof. Thus, a suitable tool (not shown) can be inserted through the alignment apertures 35 to engage the cutouts 36 thereby properly aligning the wave washer 32 to enable the tabs 33 to engage the openings 24 in the cover 20.

In operation, the clutch brake assembly 10 functions in a substantially conventional manner. That is, when the release bearing 14 is activated by the clutch linkage 15 and moved toward the clutch brake assembly 10, the friction facings 25 and 25' frictionally engage adjacent surfaces of the release bearing 14 and the housing of the transmission 13 thereby restraining the facing and clutch cover assemblies 16 and 17 and the wave washer 32 of the clutch brake assembly 10 from rotating. The wave washer 32 provides a controlled frictional inner coupling between it and the adjacent outer washers 30 and 30'. The desired frictional coupling and torque transfer between the components of the clutch brake assembly 10 may be adjusted by the variation of conventional parameters such as spring thickness, wave height, surface material and finish and the like. The outer washers 30 and 30' are rotationally coupled to the inner brake washer 26 through the lost motion coupling of the lugs 29 and the elongated slots 31 and 31'. Since the inner brake washer 26 is rotationally coupled to the drive shaft 11 by the lugs 27, the clutch brake assembly 10 slows the rotating shaft 11 and the driven elements of the transmission 13, thereby facilitating gear ratio selection.

Since the outer washers 30 and 30' and not the wave washer 32 contact the covers 18 and 20, the contact area is increased for decreased wear and increased heat dissipation. Furthermore, the force tending to spread the covers is no longer concentrated in a small area such that there is decreased spread between the covers. These advantages tend to increase the torque available for slowing rotation of the drive shaft.

In accordance with the provisions of the patent statutes, the present invention has been described in what is considered to represent its preferred embodiment. However. it should be noted that the invention can be practiced otherwise than as specifically illustrated and described without departing from its spirit or scope.

What is claimed is:

1. A clutch brake apparatus comprising:
    a pair of opposed covers secured together to define an internal cavity therebetween, said covers including outer friction surfaces, said friction surface on each said cover adapted to be frictionally engaged during use by an associated drive line component;
    a pair of outer washers disposed between said covers in said cavity, each of said outer washers having a reduced thickness portion formed adjacent the outer periphery thereof, said reduced thickness portions being oriented so as to define an annular groove between said outer washers;
    an inner brake washer disposed between said covers in said cavity, each of said outer washers having means for engaging said inner brake washer for rotation therewith; and
    spring means disposed within said annular groove to urge said outer washers into engagement with said covers.

2. The apparatus according to claim 1 wherein said spring means is a compression spring.

3. The apparatus according to claim 1 wherein said spring means is a wave washer.

4. The apparatus according to claim 1 wherein said spring means includes a pair of diametrically opposed radially outwardly extending tabs and one of said covers has a pair of diametrically opposed openings formed therein for retaining said tabs thereby coupling said spring means for rotation with said one cover.

5. A clutch brake assembly for cooperation with a rotating drive shaft and a transmission housing comprising:
    a pair of opposed covers secured together to define an internal cavity therebetween, said covers including outer friction surfaces, said friction surface on each said cover adapted to be frictionally engaged during use by an associated one of a clutch and a transmission housing;
    a ring shaped inner brake washer disposed between said covers in said cavity and having means for rotationally engaging a vehicle drive shaft;
    a pair of ring shaped outer washers disposed between said covers in said cavity and concentric with said inner brake washer, each of said outer washers having a reduced thickness portion formed adjacent the outer periphery thereof, said reduced thickness portions being oriented so as define an annular groove between said outer washers, said outer washers having a lost motion coupling with said inner brake washer; and
    an axially resilient means disposed within said annular groove for axially biasing said outer washers into engagement with inner surfaces of said covers.

6. The clutch brake assembly according to claim 5 wherein said axially resilient member is a compression spring.

7. The clutch brake assembly according to claim 5 wherein said axially resilient member is a wave washer.

8. The clutch brake assembly according to claim 7 wherein said wave washer has four waves.

9. The clutch brake assembly according to claim 5 wherein said lost motion coupling includes a pair of radially outwardly extending lugs formed on said inner brake washer and a pair of cooperating slots formed in an inner periphery of each of said outer washers, each of said slots having a longer circumferential length than the circumferential length of a cooperating one of said lugs.

10. The clutch brake assembly according to claim 5 wherein said outer friction surfaces include annular facings of friction material attached to said covers.

11. The clutch brake assembly according to claim 5 wherein said axially resilient member includes a pair of radially outwardly extending tabs and one of said covers includes a pair of openings formed therein for retaining said tabs whereby upon rotation of said one cover, said axially resilient member rotates with said one cover.

12. The clutch brake assembly according to claim 11 including a pair of alignment apertures formed in the other one of said covers and a cutout formed in each of said tabs, said cutouts adapted to engage an alignment tool inserted through said alignment apertures in said other cover.

13. A clutch brake apparatus for cooperation with a rotating drive shaft extending between a transmission housing and a clutch release bearing comprising:
    a clutch brake housing having opposed external friction surfaces adapted to be frictionally engaged during use by a clutch release bearing and a transmission housing, said clutch brake housing having an aperture formed therein for receiving a drive shaft coupling a clutch to a transmission of a vehicle;
    a ring shaped inner brake washer enclosed in said housing and including a pair of radially inwardly extending lugs adapted to engage the vehicle drive shaft and a pair of radially outwardly extending lugs;
    a pair of outer washers enclosed in said housing. each of said outer washers having a reduced thickness portion formed adjacent the outer periphery thereof. said reduced thickness portions being oriented so as to define an annular groove between said outer washers, and each of said outer washers having a pair of radially inwardly facing slots formed therein, said outer washers being disposed concentrically with said inner brake washer and said outwardly extending lugs and said slots cooperating to form a lost motion coupling between said inner brake washer and said outer washers; and a wave washer disposed within said annular groove for biasing said outer washers into engagement with inner surfaces of said clutch brake housing.

* * * * *